R. H. WHITNEY.
DILATOR.
APPLICATION FILED JUNE 4, 1920.
1,400,648.
Patented Dec. 20, 1921.
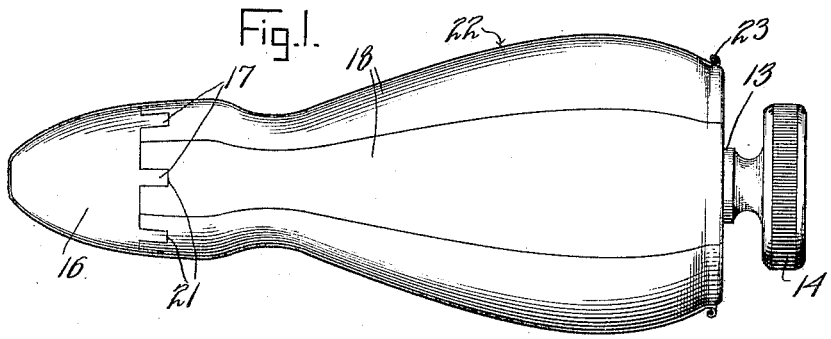
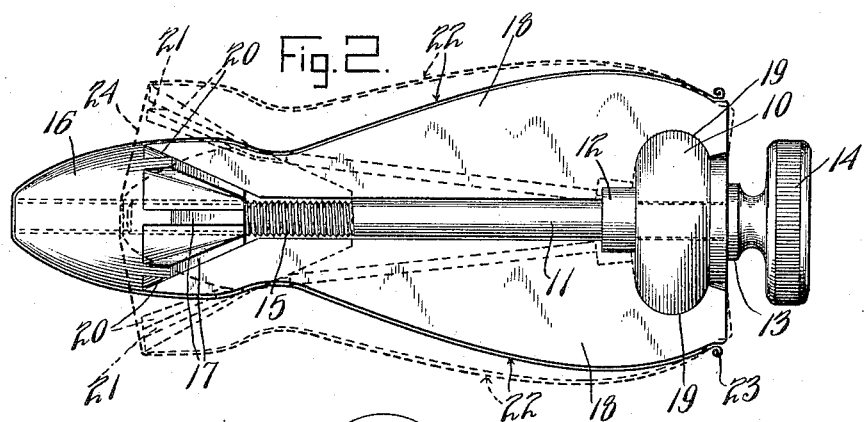
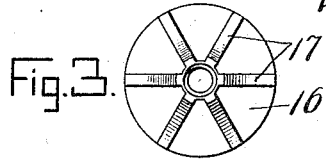
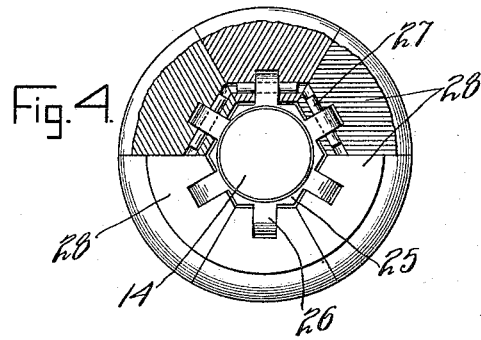
Inventor
Robert H. Whitney
By Bradford Morrill Birnam
Attorneys

UNITED STATES PATENT OFFICE.

ROBERT H. WHITNEY, OF JACKSONVILLE, FLORIDA.

DILATOR.

1,400,648.  Specification of Letters Patent.  Patented Dec. 20, 1921.

Application filed June 4, 1920. Serial No. 386,483.

*To all whom it may concern:*

Be it known that I, ROBERT H. WHITNEY, a citizen of the United States, residing at Jacksonville, in the county of Duval and State of Florida, have invented certain new and useful Improvements in Dilators, of which the following is a specification.

This invention relates to dilators and has for an object to provide a device of the class, embodying new and improved features of convenience, reliability and comfort.

Further object of the invention is to provide a dilator, having separable parts, which may be disassociated for sanitation and antisepticising.

With these and other objects in view the device comprises certain novel units, elements, parts, combinations, mechanical movements and functions, as will be hereinafter more fully described and claimed.

Referring to the accompanying drawings, which are made a part hereof and on which similar reference characters indicate similar parts, Figure 1 is a view in elevation of the improved dilator, in its preferred form, Fig. 2 a view of the dilator, with the elastic envelop in section and certain of the expansible segments removed, Fig. 3 a view in end elevation of the expander cone, and Fig. 4 a view of a modified type, taken partly in end elevation and partly in section, through the hinge.

The improved dilator, which forms the subject matter of this application, comprises a core 10 having a shaft 11 extending therethrough and retained against longitudinal movement by a collar 12 rigidly secured thereto upon one side of the core 10 and the hub 13 upon the opposite side, the latter preferably being formed integral with the knurled head 14.

At its end opposite the knurled head 14 the shaft 11 is screw threaded, as indicated at 15, and an expander cone 16 is mounted thereon. The expander cone 16 is substantially two cones base to base, the outer or extreme cone being smooth, while the inner cone is provided with a plurality of ribs 17 disposed upon planes radial to the axis of the cone. As will be noted, especially from Fig. 2, the core 10 has a rounded periphery and mounted thereon are a plurality of expanding segments 18. These expanding segments are provided, each with an arcuate bearing surface 19 fitting over and upon the rounded surface of the core 10 as a bearing to permit the segments to be moved slidably upon such bearing surface. At their opposite ends the segments are provided with inclined surfaces 20 corresponding in angle, when the device is in closed position as shown at Fig. 1, to the ribbed cone and also provided with grooves 21 embracing such ribs, so that a bearing is formed by the engagement of the grooves 21 upon the rib 17 to prevent rotation of the cone 16 relative to the associate expanding segments 18.

Upon the exterior of the assembled device an elastic envelop 22 is positioned preferably having a roll or bead 23 which engages over the bilge of the assembled segments, as indicated at Figs. 1 and 2. As this elastic envelop will be composed of rubber which is transparent it has been shown only by the use of a heavy line at Figs. 1 and 2, the dotted line 24 at Fig. 2 indicating the position of the envelop when the device is expanded.

Instead of employing the rounded surface of the core 10 as a fulcrum for the expanding segments 18, a type is employed, as shown at Fig. 4, having a core 25 of star-shape carrying a plurality of radially extending ears 26 which are perforated to receive hinge pintles 27 upon which the expanding segments 28 are permanently secured. The form of the segments and the form and operation of the expanding cone will be the same as shown at Figs. 1 and 2, the difference residing in the manner of hinging the segments upon the core.

In operation, it will be apparent that the dilator in the condition shown at Fig. 1 will be inserted in any orifice and by manipulating the knurled head 14 the segments will be expanded covered by the elastic envelop presenting a smooth and non-irritating surface. The return movement of the knurled head and the elasticity of the envelop will return the parts to normal. When desired the envelop may be removed in any approved manner as by rolling the same down, beginning at the head 23, whereupon the device may be antisepticised or cleansed, first disassociated if found necessary or desirable.

Having thus fully described my said in- vention, what I claim as new and desire to secure by Letters Patent, is—

1. A dilator comprising a core, a plurality of segments pivoted on the core at one end, and forming a body of circular cross-section in closed position, and an expander having a tapered portion extending between the free ends of said segments, and another tapered portion forming the forward end of the dilator, substantially as set forth.

2. A dilator comprising a core, a plurality of segments pivoted on the core at one end, and forming a body of circular cross-section in closed position, and an expander having a tapered portion extending between the free ends of said segments and another tapered portion forming the forward end of the dilator, and means extending from the rear of the dilator and connected to the expander for actuating the same, substantially as set forth.

3. A dilator comprising a core, a plurality of segments pivoted on the core at one end, and forming a body of circular cross-section in closed position, and an expander having a tapered portion extending between the free ends of said segments and another tapered portion forming the forward end of the dilator, means extending from the rear of the dilator and connected to the expander for actuating the same, and means to prevent relative rotation of the expander and the segments operated thereby, substantially as set forth.

4. A dilator consisting of a core, expansible members pivoted on the core, an expander between the free ends of the expansible members, a rotary screw journaled in the core and having threaded engagement with the expanders, and an elastic cover surrounding and contacting with said expansible members, substantially as set forth.

5. A dilator comprising a core, expansible members pivoted on the core, an expander between the free ends of the expansible members, the forward portion of said expander forming with the surface of the expansible members when in their closed position a smooth unbroken outer surface, and a rotary screw journaled in the core and having threaded engagement with the expander, substantially as set forth.

6. A dilator comprising a core, expansible members pivoted on the core, an expander between the free ends of the expansible members, the forward portion of said expander forming with the surface of the expansible members when in their closed position a smooth unbroken outer surface, and a rotary screw journaled in the core and having threaded engagement with the expander, and means to prevent rotation of the expander, substantially as set forth.

7. A dilator comprising a core having a rounded surface, a plurality of segments pivotally mounted near one end about the core each segment having a concave part to engage said rounded surface and forming a body circular in section and means for expanding said segments at the end farthest from the pivots comprising a rotary screw journaled in the core and carrying a thumb piece, and an expander threaded on the screw, said expander being rounded at its forward end and tapered at its rearward end to engage tapered surfaces on the segments, and the expander having ribs to engage grooves in the adjacent ends of the segments to prevent relative rotation thereof, substantially as set forth.

In witness whereof, I have hereunto set my hand and seal at Jacksonville, Florida, this 29th day of May, A. D., nineteen hundred and twenty.

ROBERT H. WHITNEY.

Witnesses:
J. W. HOLLAND,
MABEL WILLIAMS.